R. A. BOTTS.
HARVESTER FOR EGYPTIAN CORN, MILO MAIZE, AND THE LIKE.
APPLICATION FILED JULY 21, 1919.
1,340,816.
Patented May 18, 1920.
4 SHEETS—SHEET 3.
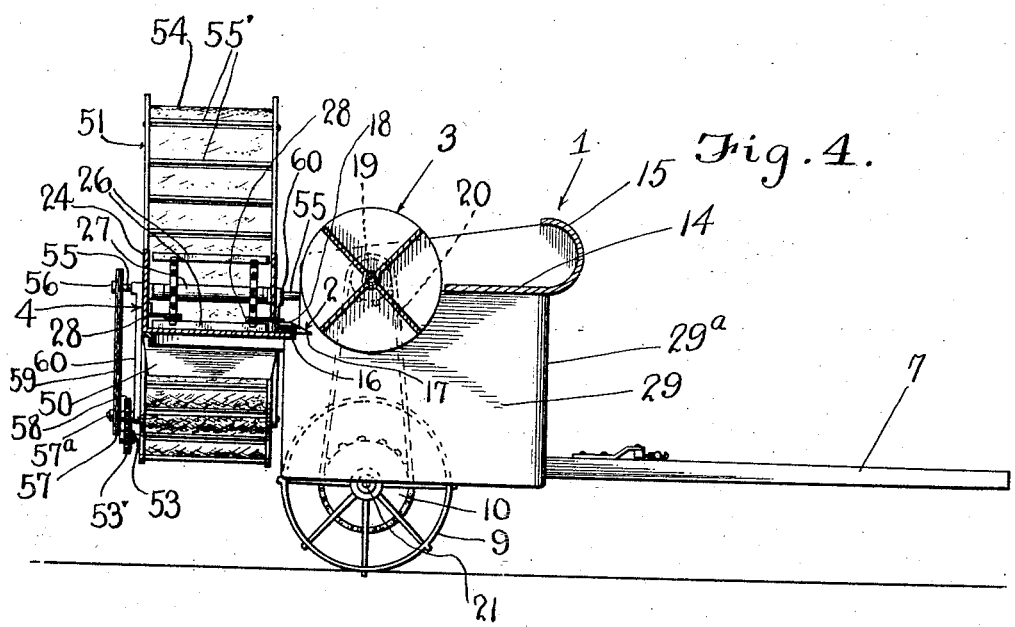
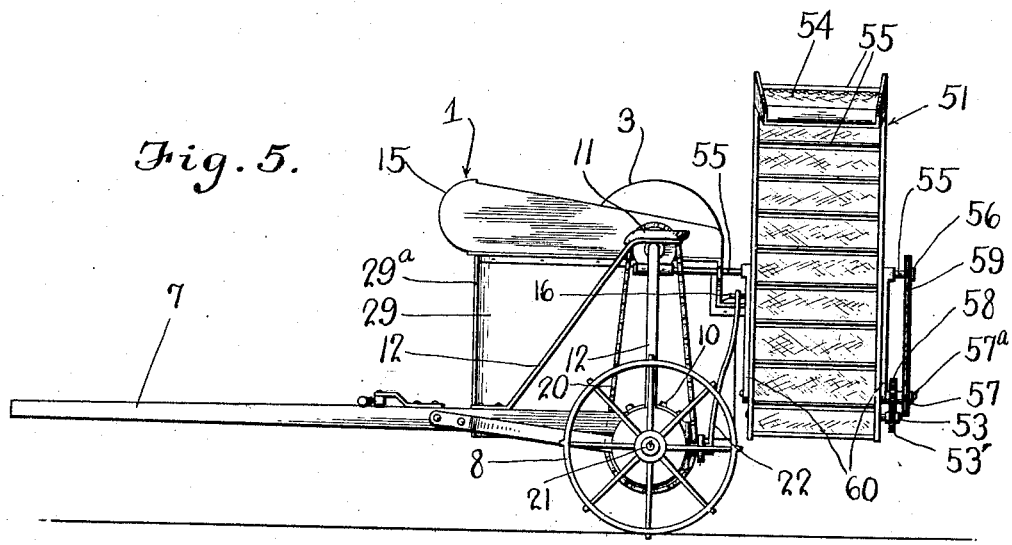
WITNESS:
L. B. James
Raymond A. Botts
INVENTOR.
BY
Victor J. Evans
ATTORNEY.

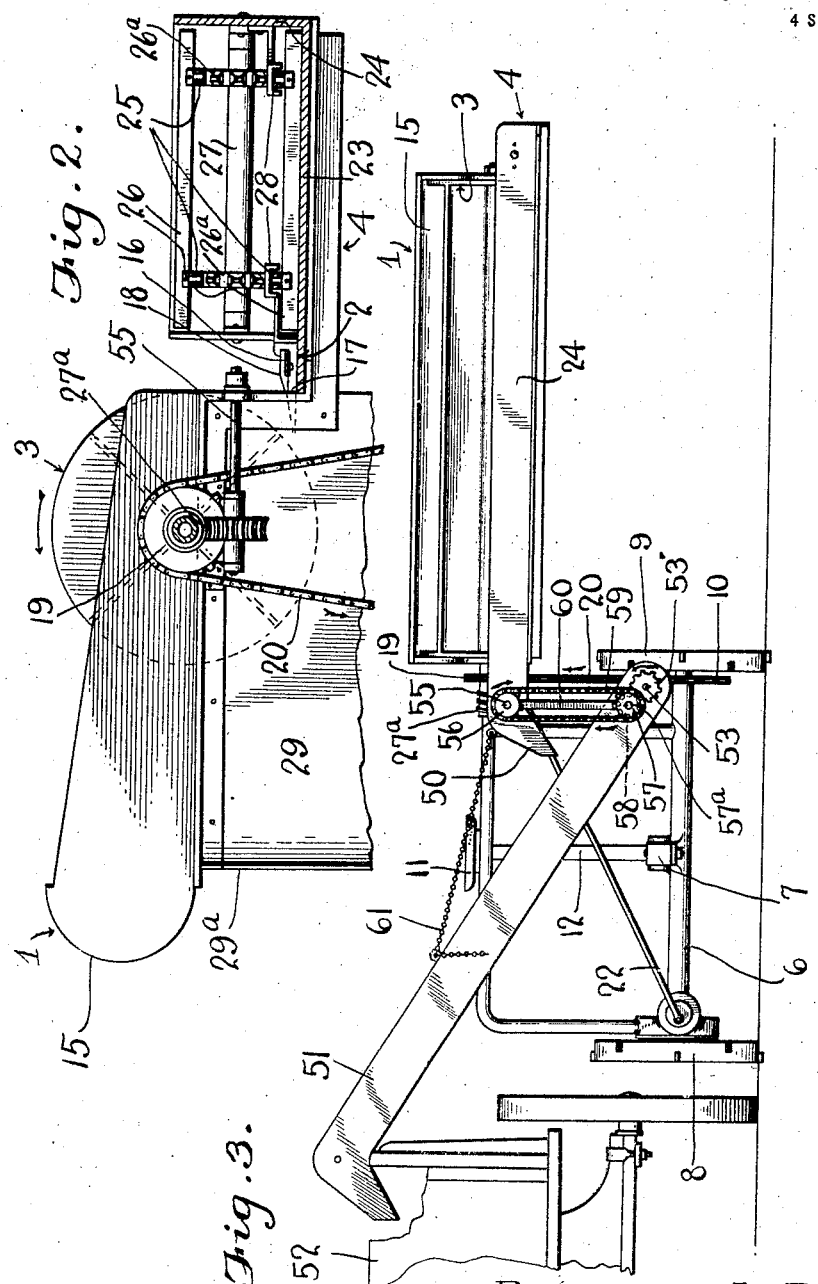

R. A. BOTTS.
HARVESTER FOR EGYPTIAN CORN, MILO MAIZE, AND THE LIKE.
APPLICATION FILED JULY 21, 1919.

1,340,816.

Patented May 18, 1920.
4 SHEETS—SHEET 4.

WITNESS:

Raymond A. Botts
INVENTOR.
BY
Victor J. Evans
ATTORNEY.

UNITED STATES PATENT OFFICE.

RAYMOND A. BOTTS, OF HANFORD, CALIFORNIA.

HARVESTER FOR EGYPTIAN CORN, MILO MAIZE, AND THE LIKE.

1,340,816.         Specification of Letters Patent.       Patented May 18, 1920.

Application filed July 21, 1919. Serial No. 312,174.

*To all whom it may concern:*

Be it known that I, RAYMOND A. BOTTS, a citizen of the United States, residing at Hanford, in the county of Kings and State of California, have invented new and useful Improvements in Harvesters for Egyptian Corn, Milo Maize, and the like, of which the following is a specification.

Difficulty has been experienced in the harvesting of Egyptian corn, Milo maize and the like, because of the uneven height of the heads and the fact that too much stalk is cut with those heads that are comparatively high.

The general object, therefore, of my invention is the provision of a harvester that is adapted to compensate for the difference in the length of the stalks, and consequently is possessed of the capacity of cutting the heads from the stalks at a common point below the heads.

My novel harvester is also possessed of the capacity of gathering the heads into a receptacle, which receptacle is under the control of the driver or operator of the machine, and may be discharged of its contents at intervals, or alternately of conveying the heads to and dumping the same into a wagon drawn alongside the harvester. It is also within the purview of my invention to make the conveyer interchangeable with the receptacle so that the heads may be hauled out of the field when picked or cut, or may be dumped in piles in the field for drying, according to weather conditions.

My invention further includes peculiar and advantageous means for controlling the drop bottom of the receptacle when the latter is employed.

With the foregoing in mind the invention will be fully understood from the following description and claims when the same are read in connection with the drawings, accompanying and forming part of this specification, in which:

Fig. 2 is a detail longitudinal-vertical section taken in the plane indicated by the line 2—2 of Fig. 1.

Fig. 3 is a rear elevation of the harvester.

Fig. 4 is a longitudinal vertical section on the line 4—4 of Fig. 1.

Fig. 5 is a left-hand side elevation of the harvester *per se.*

Similar numerals designate corresponding parts in Figs. 1 to 5, to which reference will first be had.

Figure 1:
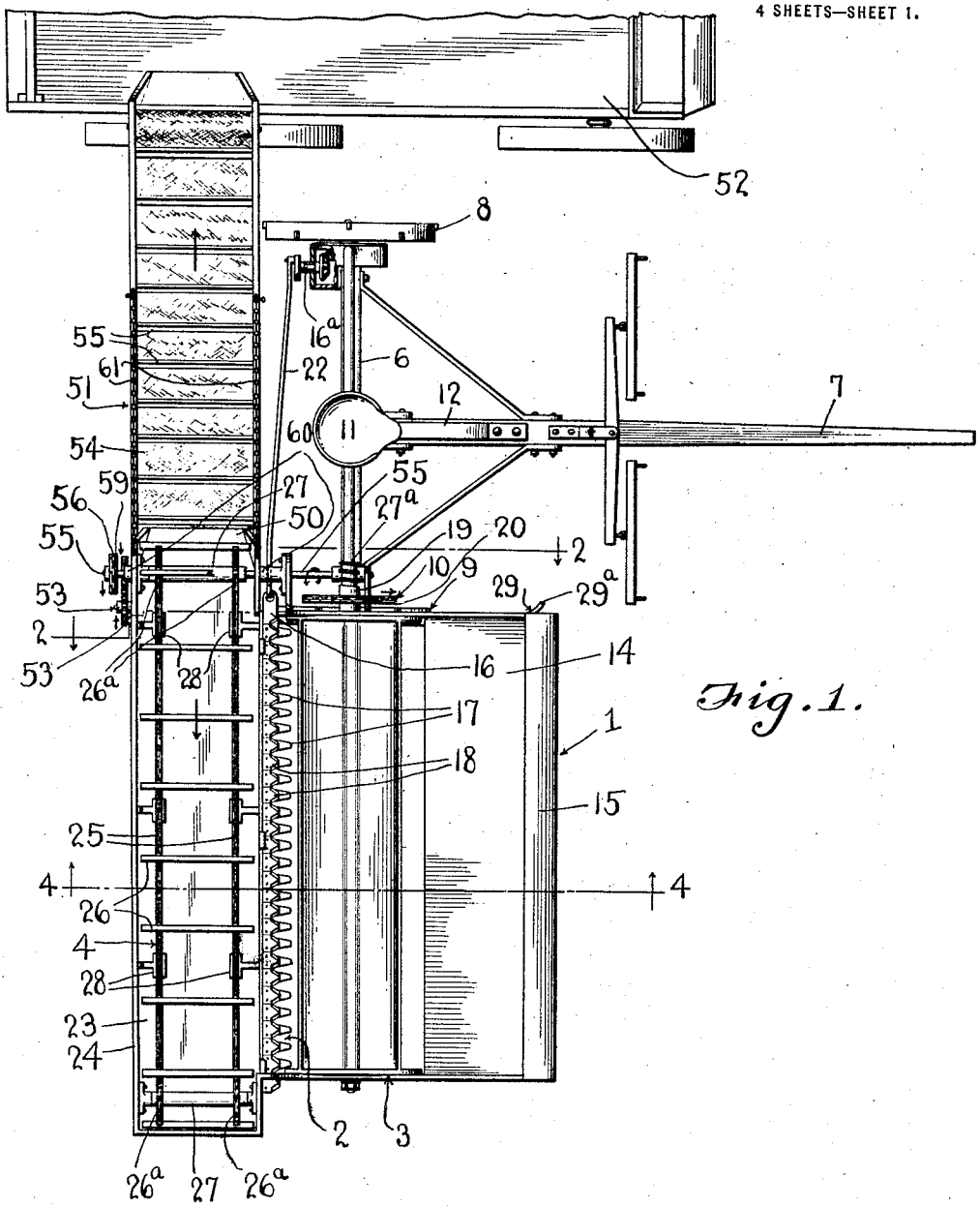
Figure 1 is a top plan view of one type of harvester embodying my invention.

Among other features my novel harvester comprises an organized mechanism that includes a stalk bender 1, a cutting apparatus 2, a reel 3 which, in common with the cutting apparatus 2 and the bender 1, is arranged transversely of the machine, and a transversely traveling conveyer 4 disposed in rear of the reel and adapted to carry the heads transversely of the harvester. The bender 1, as its name imports, is designed to bend the stalks downwardly so that the same will be engaged by the cutting apparatus 2 at about the same distance from the heads thereof. At such time the stalks will be more or less inclined according to the height, and the reel 3 will operate to further bend the stalks over the cutting apparatus, and will not only prevent the severed heads from falling in front of the cutting apparatus, but will tend to throw the heads rearwardly into engagement with the conveyer 4.

I have elected to show and describe the said organized mechanism as incorporated in a horse-drawn harvester of mowing machine type. I would have it understood, however, that without affecting my invention, the said organized mechanism may be embodied in harvesters of other types, such as those that are adapted to be arranged in front of and attached to a tractor and in which the working parts will be driven from the tractor.

The main frame 6 of my novel harvester may obviously be of the construction illustrated, or of any other construction compatible with the purpose, of the invention, and to the same is connected a tongue 7. The said main frame is supported by ground wheels 8 and 9, and fixed with respect to the inner ground wheel 9 is a sprocket gear 10. The driver's seat 11 is carried by a support 12 on frame 6, and is preferably disposed above the upper transverse frame portion as illustrated. By reference to Figs. 2 and 4, it will be observed that the bender 1 has a lower horizontal portion 14, and a forward portion 15 that extends upwardly from the horizontal portion and then rearwardly and is rounded or convex at its forward side. From this it follows that the said forward convex portion 15 will prevent the heads that are bent over from catching against the forward edge of the horizontal portion or table 14. The bender 6 is shown as fixed with respect to the main frame, but manifestly it may be made adjustable so that it may be positioned at various heights.

The cutting apparatus 2 comprises a reciprocatory sickle bar 16 and guards 17 which are directed rearwardly below the sickle bar 16, Fig. 1, and in the preferred embodiment of the invention are comparatively long, and are adapted to stretch the heads and effectually prevent the said heads from bending or otherwise passing under the sickle bar. It will be noticed that the guards are spaced sufficiently far apart to permit the stalks to pass between them *en route* to the sickle bar, and that there is one guard in front of every blade 18 on the bar 16.

By reference to the drawings, it will be observed that the reel 3 is equipped at its left-hand end with a sprocket gear 19, and that said sprocket gear 19 is connected through a sprocket belt 20 with the beforementioned gear 10, whereby forward rotation of the reel will be caused to attend forward movement of the harvester.

Interposed between the sickle bar 16 of the cutting apparatus and a shaft 16ª connected with the drive-shaft 21 of the machine, Fig. 1, is the pitman rod 22 which is connected with the sickle bar 16 and the shaft 16ª in the manner common to mowing machines or in any other approved manner compatible with the operation of my improvement.

A conveyer table 23 is arranged transversely in rear of the cutting apparatus, and is provided with a transverse guard wall 24 at its rear edge, and over the said table is arranged to move the lower stretch of the conveyer 4 which is of endless type and is made up, by preference, of sprocket belts 25 and wooden strips 26 suitably spaced apart and connected to the chains 25 and adapted to move on the table 23 and carry with it the severed heads. The sprocket belts 25 are mounted on sprocket gears 26ª, carried by the drums 27, and in the preferred embodiment of the invention guides 28 Fig. 4, are provided, whereby the strips 26 will be caused to move close to the table 23 and will be prevented from slipping over the heads. The shaft complementary to the drum 27 adjacent to the driver's seat 11 is connected by gearing 27ª, Fig. 1, with the shaft of the reel 3. In consequence of this, forward rotation of the reel will be attended by movement of the lower stretch of the conveyer 4 toward the left-hand side of the harvester.

At 29 is a fender which rests adjacent to the inner ground wheel and is designed to prevent the said wheel from running over and depressing leaning stalks. On the other hand the said fender is adapted to deflect leaning stalks so as to guide the same in front of the cutting apparatus, its forward portion being deflected laterally inward, as indicated by 29ª, Fig. 1.

The operation of my novel harvester will be apparent from the foregoing, and need not be reiterated except to say that incidental to the forward progress of the harvester, the stalks will be bent by the bender 1, and will be engaged by the guards 17 on the bar 40 and the blades 18, on the sickle bar 16, while the heads will be engaged by the reel 3, and when severed from the stalks will be deliverd by said reel to the conveyer 4 by which the heads will be discharged to the elevator for transfer to the body of the wagon.

Figure 6:
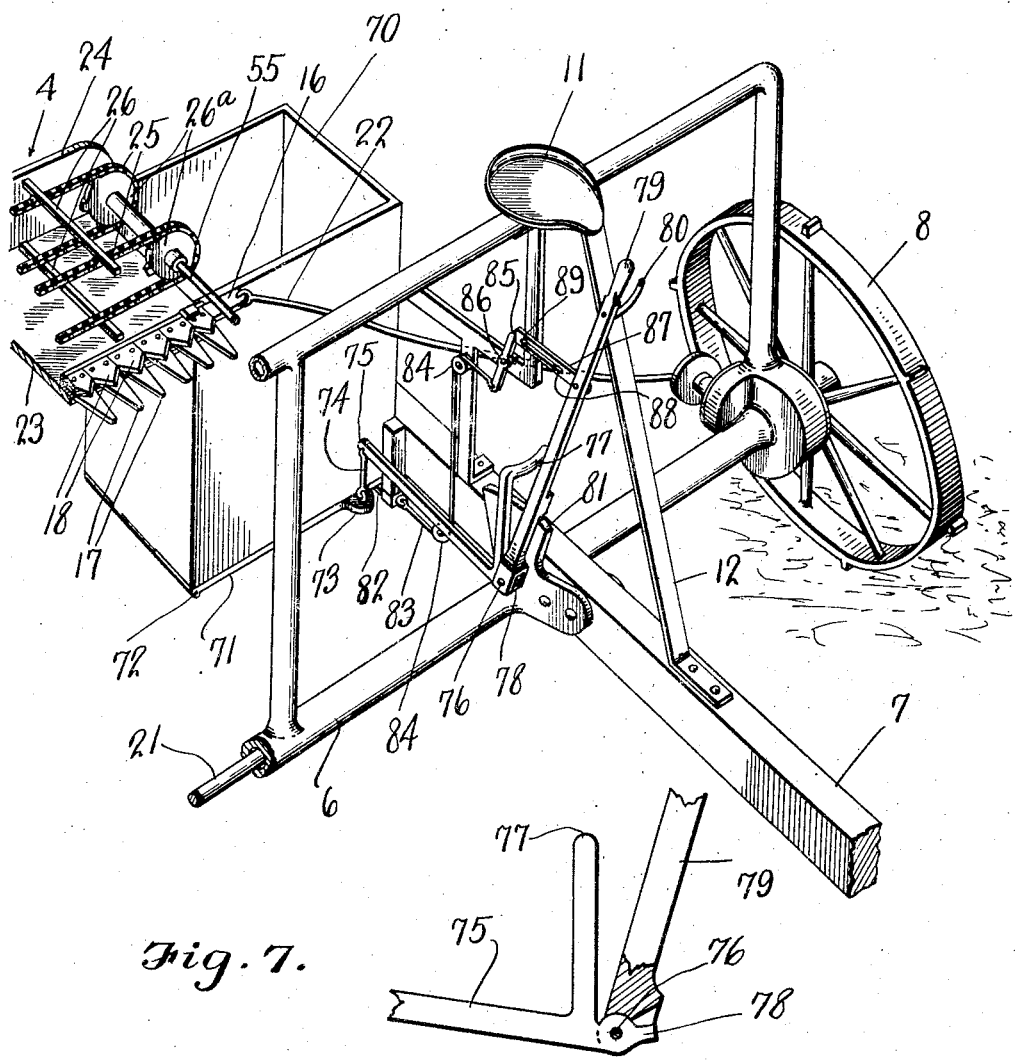
Figs. 6 and 7 are detail perspectives illustrative of the embodiment in which the receptacle with drop bottom is employed.
Figure 7:
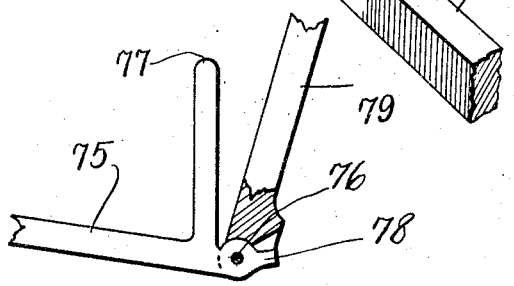

When it is desired to dump the heads in the field at intervals, instead of hauling the heads from the field, I employ in lieu of the elevator 51 of Figs. 1 to 5, a receptacle 70, Fig. 6, carried at one side of the machine in position to receive heads from the inner end of the conveyer table. The said receptacle 70 is clearly shown in Fig. 6 in proper relation to the conveyer table and the conveyer 4. Said receptacle is provided with a drop bottom 71 hinged at 72, and on the said drop bottom 71 is an extension 73, connected through a link 74 with a lever 75 fulcrumed at 76 on the frame and equipped with a pedal 77, and also has a short, forwardly extending arm 78, Fig. 7. Also fulcrumed at 76 on the frame is a hand lever 79, equipped with a detent 80 for coöperation with a fixed segmental rack 81, and at 82 is a rectilinearly movable latch for fastening the drop bottom 71 in its closed position. Said latch 82 is connected through a cable 83 passed around the sheaves 84 with the lower arms of a lever 85, fulcrumed at 86 on the frame. A bar 87 is connected to the hand lever 79 and is slotted at 88 to slide and swing on a slot 89, carried by the frame. Manifestly when the driver draws the lever 79 rearwardly, the bar 87 acts against the upper arm of the lever 85 to rock the said lever and thereby disengage the latch 82 from the drop bottom 71, permitting the said drop bottom to fall. It will also be apparent that in the event of the drop bottom 71 failing to open, the engagement between the hand lever 79 and the pedal lever 77 will be positively brought about incidental to the last portion of the rearward movement of lever 79. In order to close the drop bottom 71 of the receptacle 70, the driver presses forwardly with his foot on the pedal lever 77 until the said bottom passes the latch 82, which is preferably spring-pressed in rearward direction.

In the preferred arrangement, Fig. 3, the inner end of the table 23 is provided with a spout 50, and arranged to receive heads from said spout 50 is an elevator 51 that is adapted to discharge the heads into a wagon 52, drawn alongside the harvester. The frame of the elevator 51 carries adjacent to its lower end a lower shaft 53 for driving the elevator draper 54, the slots 55 of which are adapted to prevent retrograde movement of the heads. The shaft 53 is driven from the inner shaft 55 of the transverse conveyer through the driving connection, best shown in Figs. 1 and 3, and made up of a sprocket gear 56 on shaft 55, a sprocket gear 57, carried by a shaft 57ª in the frame of the elevator 51, a spur gear 58 fixed with respect to the gear 57 and intermeshed with the spur gear 53, and a sprocket belt 59 connecting the sprocket gears 56 and 57. The inner end portion of the frame of the elevator 51 is connected with the shaft 55 through the medium of hangers 60, pivoted to the shafts 55 and 57ª, so as not to interfere with vertical adjustment of the upper end of the elevator frame. A chain 61, Fig. 3, is preferably, though not necessarily, employed to maintain the elevator in the inclined position illustrated, and to permit of the elevator being adjusted when occasion demands.

When deemed expedient, the improved harvester may be so constructed that either the receptacle 70 or the before described elevator 51 may be employed, as occasion demands.

Having described my invention, what I claim and desire to secure by Letters-Patent, is:

1. In a harvester for Egyptian corn, Milo maize and the like, an organized mechanism comprising a cutting apparatus, a fixed stalk bender arranged in front of the cutting apparatus and having a forward portion the forward side of which is rounded or convex, and also having a table extending rearwardly from the bottom of said forward portion, and a reel disposed above the cutting apparatus and between same and the table of the stalk bender.

2. In a harvester for Egyptian corn, Milo maize and the like, an organized mechanism comprising a cutting apparatus, a fixed stalk bender arranged in front of the cutting apparatus and having a forward portion the forward side of which is rounded or convex, and also having a table extending rearwardly from the bottom of said forward portion, a reel disposed above the cutting apparatus and between same and the table of the stalk bender, and a conveyer disposed in rear of the cutting apparatus and reel.

3. In a harvester for Egyptian corn, Milo maize and the like, an organized mechanism comprising a cutting apparatus, a fixed stalk bender arranged in front of the cutting apparatus and having a forward portion the forward side of which is rounded or convex, and also having a table extending rearwardly from the bottom of said forward portion, a reel disposed above the cutting apparatus and between same and the table of the stalk bender, a table arranged in rear of the cutting apparatus and reel, and an endless conveyer movable above said table.

4. In a harvester for Egyptian corn, Milo maize and the like, the combination of a main shaft, ground wheels thereon, a main frame supported on said shaft, a transversely arranged stalk bender arranged over and extending inwardly beyond the inner ground wheel, a fender connected with said bender and disposed alongside the inner ground wheel, a cutting apparatus disposed in rear of the bender, a reel disposed above the cutting apparatus and in rear of the bender, a conveyer disposed in rear of the cutting apparatus, a driving connection between the main shaft and the sickle bar of the cutting apparatus, a driving connection intermediate the inner ground wheel and the reel, and a driving connection intermediate the reel and the conveyer.

5. In a harvester for Egyptian corn, Milo maize and the like, the combination of a main shaft, ground wheels thereon, a main frame supported on said shaft, a transversely arranged stalk bender arranged over and extending inwardly beyond the inner ground wheel, a fender connected with said bender and disposed alongside the inner ground wheel, a cutting apparatus disposed in rear of the bender, a reel disposed above the cutting apparatus and in rear of the bender, a conveyer disposed in rear of the cutting apparatus, a driving connection between the main shaft and the sickle bar of the cutting apparatus, a driving connection intermediate the inner ground wheel and the reel, a driving connection intermediate the reel and the conveyer, a driver's seat on the frame, a transverse table under the conveyer, a receptacle arranged to receive heads from said table and having a drop bottom, means for yieldingly holding said drop bottom in closed position and lever construction for releasing the drop bottom and subsequently raising the same into latched position.

In testimony whereof I affix my signature.

RAYMOND A. BOTTS.